Dec. 30, 1941.   G. F. BOESSER   2,268,380
FLASH LAMP ATTACHMENT FOR CAMERAS
Filed Dec. 15, 1939   3 Sheets—Sheet 1
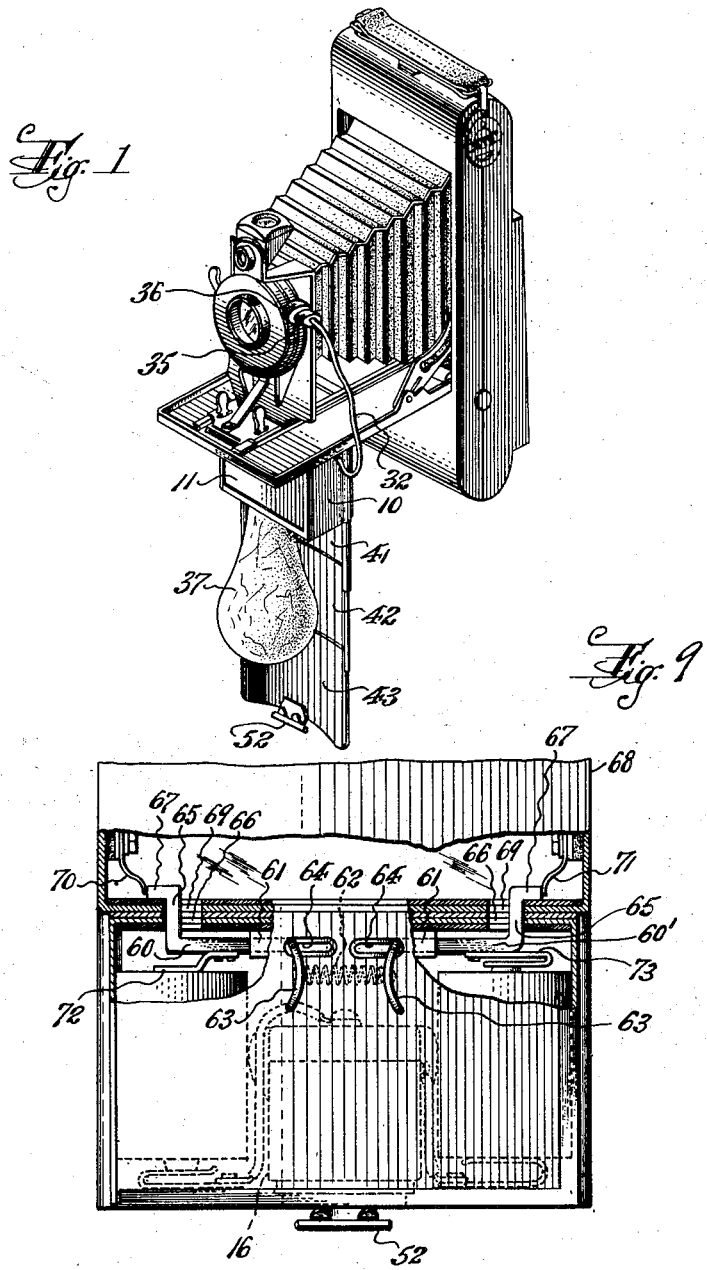
INVENTOR
George F. Boesser,
BY
George D. Richards
ATTORNEY Dec. 30, 1941.   G. F. BOESSER   2,268,380
FLASH LAMP ATTACHMENT FOR CAMERAS
Filed Dec. 15, 1939   3 Sheets-Sheet 2
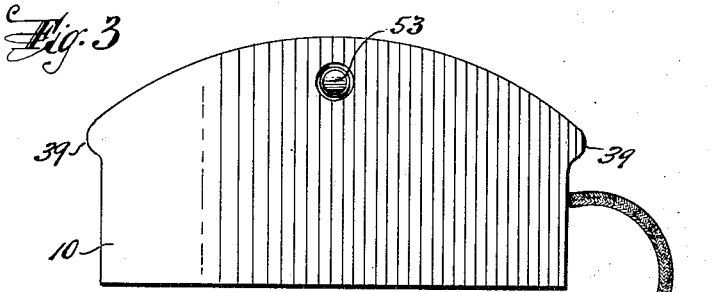
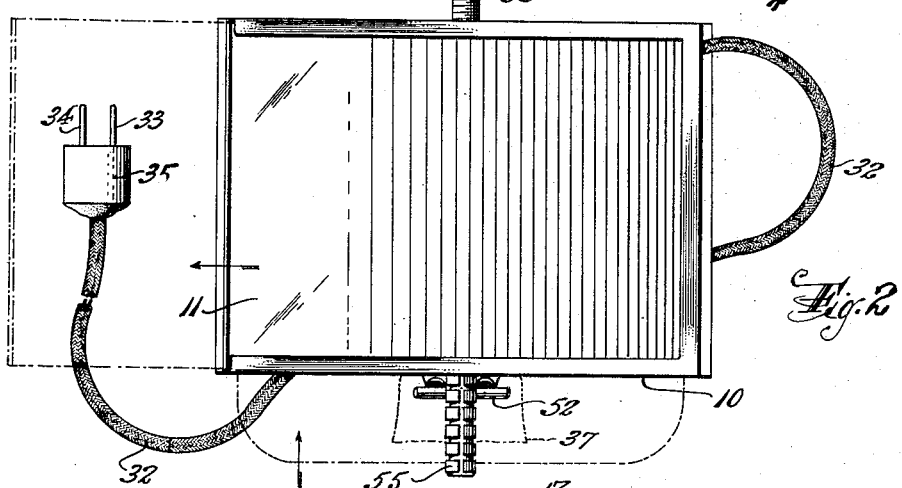
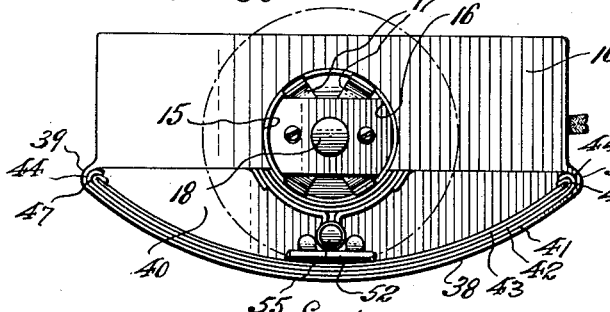
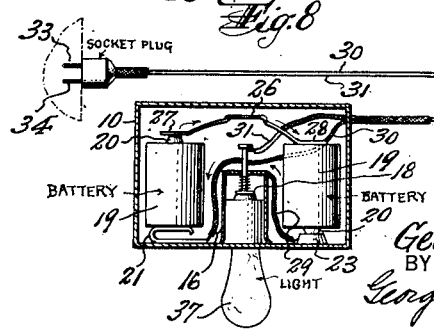
INVENTOR
George F. Boesser,
BY
George D. Richards
ATTORNEY Dec. 30, 1941.  G. F. BOESSER  2,268,380
FLASH LAMP ATTACHMENT FOR CAMERAS
Filed Dec. 15, 1939  3 Sheets—Sheet 3
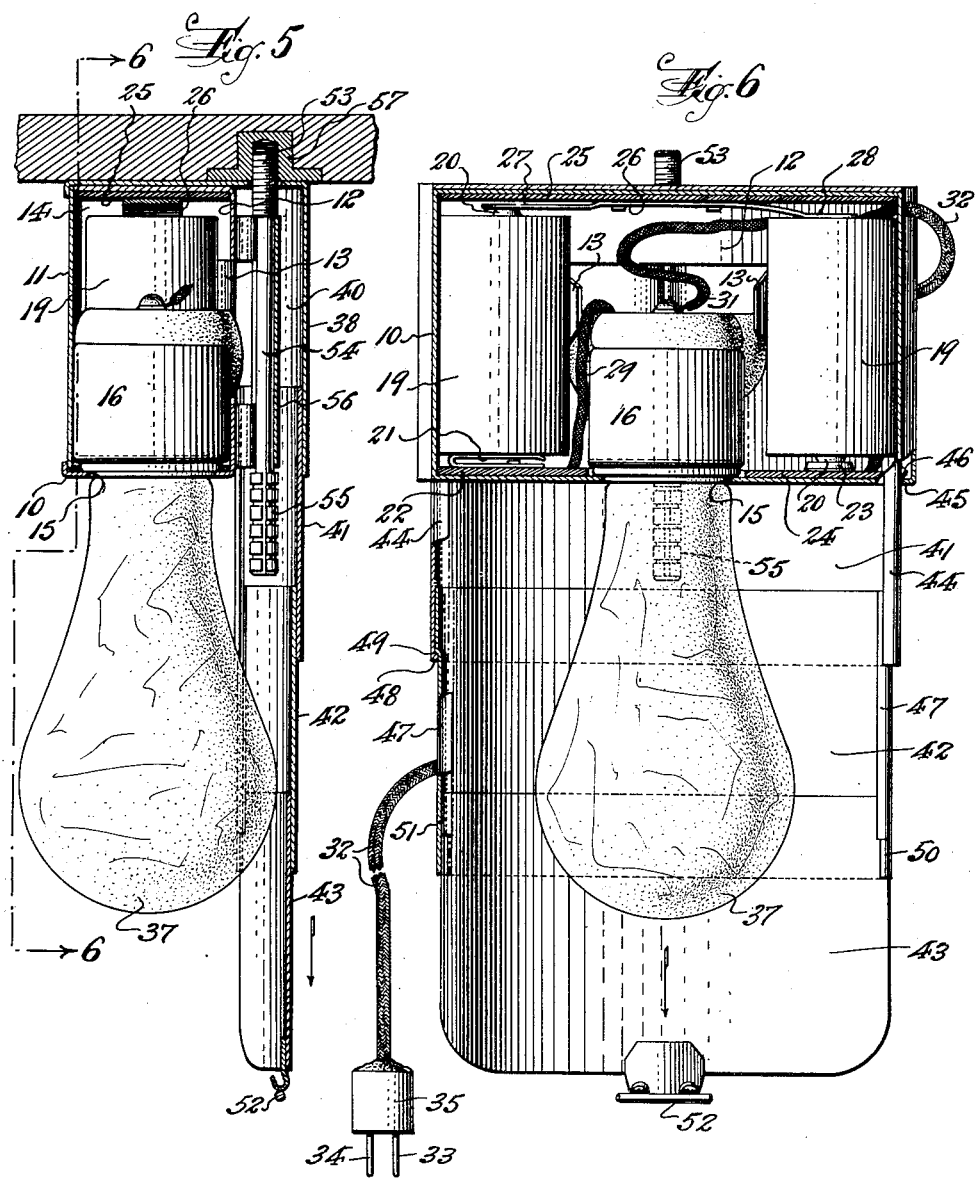
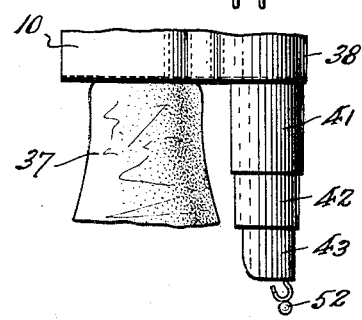
INVENTOR
George F. Boesser,
BY
George D. Richards
ATTORNEY Patented Dec. 30, 1941

2,268,380

UNITED STATES PATENT OFFICE 2,268,380

FLASH LAMP ATTACHMENT FOR CAMERAS

George F. Boesser, Arlington, N. J.

Application December 15, 1939, Serial No. 309,399

2 Claims. (Cl. 67—29)

This invention relates to a novel detachable flash lamp unit for use with cameras having shutter mechanism equipped with circuit make and brake means for automatically synchronizing flash bulb and camera shutter operations; cameras of this kind being disclosed in my prior United States Patents No. 1,932,098 dated October 24, 1933, and No. 2,145,917 dated February 7, 1939.

This invention has for its principal object to provide, as a unitary device for detachable connection with a camera of the kind mentioned, a combined battery, reflector and flash bulb socket set, hereinafter referred to as a flash lamp unit.

The invention has for another object to provide a compact and simple flash lamp unit comprising a casing to house the battery and lamp bulb socket elements, the same including means to detachably couple the unit to a camera body and to the shutter actuated circuit make and break means; and a further object of the invention is to provide, in connection with the casing of the unit, a novel collapsible reflector means capable of being extended for cooperation with a flash lamp bulb engaged in the socket element of the unit.

Other objects of the invention, not at this time more particularly enumerated, will be understood from the following detailed description of the same.

Illustrative embodiments of this invention are shown in the accompanying drawings, in which:

Fig. 1 is a perspective view of a camera, showing the novel detachable flash lamp unit as operatively coupled thereto ready for use.

Fig. 2 is a front face view of the flash lamp unit per se; Fig. 3 is a top end view of the same; and Fig. 4 is a bottom end view of the same.

Fig. 5 is a central vertical longitudinal sectional view of the unit, as coupled to the camera for use; Fig. 6 is a transverse vertical section of the unit, taken on line 6—6 in Fig. 5; Fig. 7 is a fragmentary side elevation, showing the arrangement of the collapsible reflector element of the unit; and Fig. 8 is a schematic view showing the circuit wiring arrangement of the unit.

Fig. 9 is a front elevation of a unit having a modified form of means operative to both mechanically and electrically couple the same with a camera to be served thereby.

Similar characters of reference are employed in the above described views, to indicate corresponding parts.

Referring to the drawings, the novel flash lamp unit comprises a casing 10 of suitable shape having an open front side which is normally closed by a cover panel 11 slidably related thereto. Extending transversely across the interior of said casing 10, in rearwardly spaced relation to the open front side thereof, is a partition member 12. This partition member is suitably cut away to provide forwardly projecting retainer arms 13 which are respectively opposed to and spaced relative to the side walls of the casing 10. The space intermediate the open front of the casing and said partition member 12 provides a battery and lamp socket housing chamber 14.

Secured in central position within said housing chamber 14, with its open end in register with an access opening 15 provided in the bottom wall of the casing, is a lamp socket element 16 having lateral contact means 17 and a central contact button 18, the latter being yieldably mounted in connection with the socket end wall.

The spaces within the chamber 14, intermediate the retainer arms 13 and the casing side walls opposed to the latter, provide battery housing spaces within which are removably disposed the battery elements of the unit. These battery elements are of the well-known dry cell type, having the exterior electrodes thereof formed by their outer metallic casings 19, and their interior electrodes provided with externally projected contact terminals 20. In the preferred arrangement, as disclosed in the drawings, two battery cells are employed, but it will be understood that a single cell or any other multiple arrangement of cells could be used if desired. In the arrangement shown, means are provided for electrically connecting the batteries in series. In one arrangement for this purpose (see Figs. 6 and 8), a resilient contact member 21 is fixed to the casing bottom wall within and at the bottom of one battery receiving space, the same being suitably electrically insulated from the casing 10 by interposed insulation 22. A rigid contact button 23 is fixed to the casing bottom wall within and at the bottom of the other battery receiving space, the same being also suitably electrically insulated from the casing 10 by interposed insulation 24. Affixed to the casing top wall, and electrically insulated therefrom by interposed insulation 25, is a bridging contact member 26 having oppositely extending resilient contact arms 27 and 28 respectively aligned above the resilient contact member 21 of one battery receiving space and the rigid contact button 23 of the other battery receiving space. The one battery cell is arranged in one receiving space so that the bottom of its exterior electrode forming casing 19 is engaged by the resilient contact member 21 and its interior electrode contact terminal 20 with the arm 27 of the bridging contact member 26. The other battery cell is arranged in the other receiving space in reversed position, so that the bottom of its exterior electrode forming casing 19 is engaged by the arm 28 of the bridging contact member 26 and its interior electrode contact terminal 20 with the rigid contact button 23. By such arrangement the battery cells are electrically connected one with the other in series.

The lamp socket element 16 is also connected in series with the battery cell, as e. g. by a conductor 29 connected between the contact button 23 and the socket contact means 17, and these elements are operatively connected to ingoing and outgoing conductors 30 and 31 of a flexible cable 32 which is led exteriorly from the casing 10. Said conductors 30 and 31 are connected respectively with the contact pins 33 and 34 of a coupling plug 35, which is detachably engageable with an outlet 36 on the camera shutter mechanism and with which the circuit make and break means of the camera shutter mechanism is connected. One circuit conductor, e. g. the ingoing conductor 30, is led to and connected with the resilient contact member 21, and the other or outgoing circuit conductor 31 is led to and connected with the central contact button 18 of the lamp socket element. It will thus be seen that, when the unit is electrically connected with the camera shutter mechanism and the circuit is closed by the make and break means of the latter, the electrical energy of the battery cells will be delivered through the lamp socket 16 to a flash bulb 37 operatively engaged with the latter, so as to energize the latter to produce the flash illumination thereof in properly timed relation to the opening and closing of the shutter mechanism of the camera to which the unit is thus electrically connected.

When a flash bulb 37 is operatively engaged in the lamp socket element 16 of the unit, said bulb will depend from the bottom end of the unit. In order to desirably direct and concentrate the light of the flash bulb when the latter is illuminated, the unit is provided with a novel reflector means which may be normally collapsed into the casing 10 when the unit is not in use, but which may be extended and projected from the casing 10 to operative position behind the flash bulb when the unit is in use with a camera. In a preferred reflector arrangement, the casing 10 is provided with a transversely bowed rear wall 38 so formed as to provide channeled guideways 39 along its vertical sides. Said rear wall 38 is spaced relative to the partition member 12 so as to provide an intermediate reflector housing chamber 40 which is open at its lower end but closed by the casing top wall at its upper end.

The reflector means comprises a plurality of transversely concavo-convex slidably related reflector sections. Preferably said reflector sections are three in number comprising an upper section 41, an intermediate section 42 and a lower section 43. The upper section 41 is provided along its vertical margins with inturned channeled beads 44 which slidably engage and move in the channeled guideways 39 of the casing rear wall 38. Means are provided for limiting the downward, outwardly projecting movement of said upper section 41, the same preferably comprising stop shoulders 45 at the lower ends of the guideways 39, which are engageable by stop projections 46 with which the beads 44 of said upper section 41 are provided. The intermediate section 42 is also provided along its vertical margins with similar inturned channeled beads 47 of smaller cross section, the same slidably engaging and moving in the channels of the beads 44 of the upper section 41. Means are likewise provided for limiting the downward, outwardly extending movement of said intermediate section 42 relative to said upper section 41, the same preferably comprising stop shoulders 48 at the lower ends of the channels of said upper section beads 44, which are engageable by cooperating stop shoulders or projections 49 with which the intermediate section beads 47 are provided. The side marginal portions of the lower section 43 slidably engage and move in the channels of the beads 47 of the intermediate section 42, means being provided for limiting the downward, outwardly extending movement thereof, said latter means comprising inwardly offset stop shoulder forming portions 50 connected with the lower end portions of the intermediate section beads 47 with which cooperated offset stop ears 51 connect with the upper end portions of said lower section 43. At its lower free end, the lower section 43 is provided with a finger-piece 52 whereby the reflector sections may be manipulated for collapse or extension at will.

Means is provided for detachably coupling the unit to a camera in connection with which use of the unit is desired. In one arrangement of such means, the same comprises a rotatable screw-threaded coupler stud 53 disposed to project exteriorly from the top end of the casing 10. Said coupler stud 53 is provided with an axial stem 54 which is disposed to extend downwardly through the housing chamber 40. The lower end of said stem 54 terminates in a finger-piece 55 which projects outwardly through the lower open end of said housing chamber so as to be conveniently accessible for manipulation. The stem 54 is journaled in a suitable bearing support 56 which is carried by and upon the rear face of the casing partition 12, and, as thus journaled, the coupling means is supported against axial movement, although free to rotate.

The described means for detachably coupling the unit to and for cooperation with a camera to be served thereby is adapted for engagement with one of the internally screw threaded sockets 57 with which the camera is provided, and which are otherwise used for connecting the camera to and so as to be supported by a tripod, when the camera is used in making time exposures. Ordinarily the flash lamp unit of this invention is used with the camera when the latter is employed in making instantaneous or "snap-shot" exposures, under which circumstances the camera is seldom mounted on a tripod, and consequently either of the two screw threaded sockets 57, with which cameras are usually provided, is available for use in coupling the unit to the camera. Even though the camera should be mounted on a tripod by connection with a selected socket 57, the remaining socket is available and may be used for coupling the unit to the camera.

When the unit is attached to the camera and electrically connected with shutter actuated flash lamp circuit make and break means of the latter, a flash bulb 37 is engaged in the socket element of the unit and the reflector device is extended to operative projected position behind the bulb as shown in Fig. 1. With the unit thus arranged cooperatively with the camera, when the shutter mechanism of the latter is actuated to make a desired exposure, the make and break means controlled by the shutter mechanism will, at a time properly synchronized with the shutter movement, close the circuit and illuminate the flash bulb so as to light the subject of the picture desired to be taken.

It will be obvious that when the unit is detached from the camera and the bulb removed and reflector collapsed, said unit is reduced to a minimum bulk which may be easily packed for carriage or for storage.

In Fig. 9 is shown a somewhat modified means for coupling the flash lamp unit to the camera body for use therewith, said coupling means being at the same time adapted to electrically connect the battery and lamp socket elements of the unit with the camera shutter controlled circuit make and break means serving said elements. This modified coupling means comprises a pair of slide bolts 60 and 60' suitably mounted in supporting slideways 61 affixed to the top wall of the casing 10 above the battery and lamp socket elements. These slide bolts 60, 60' are yieldably outwardly urged by interposed compression spring means 62, and are further provided with manipulating finger pieces 63 having portions exteriorly projected through slots 64 in the casing front wall so as to be accessible for operation. Said slide bolts are suitably insulated from each other and from the casing. At their outer extremities said slide bolts are provided with upwardly extending arms 65 which project exteriorly through slots 66 provided in the top wall of the casing 10. These arms 65 terminate in angular latching lugs 67. For cooperation with this modified form of coupling means, the camera body 68 is provided with slots 69 corresponding to and for register with the slots 66 of the unit. When it is desired to couple the unit to the camera body 68, the slide bolts 60 are retracted to align their latching lugs 67 with the camera body slots 69, whereby said lugs may be passed upwardly through the camera body wall, whereafter by releasing the slide bolts 60 the same are projected to engage the lugs 67 over the camera body wall, as shown in Fig. 9, thus coupling the unit to the camera body. In order to simultaneously electrically connect the battery and lamp socket elements of the unit in circuit with the camera shutter controlled make and break means, one side of the latter is wired in electrical connection with a resilient contact terminal 70 mounted within the camera body so as to be engageable by the latching lug 67 of the slide bolt 60, and the other side thereof is wired in electrical connection with a resilient contact terminal 71 mounted within the camera body so as to be engageable by the latching lug 67 of the other slide bolt 60'. The slide bolts 60 and 60' are respectively provided with resilient contact shoes 72 and 73 to electrically engage the respective battery cells, which being in series connection with the flash lamp socket thus serve to connect these elements of the unit in circuit with the aforesaid make and break means, when the unit is mechanically coupled in operative relation to the camera body.

It will be understood that many changes could be made in the above described constructions and many apparently widely different embodiments of this invention could be made without departing from the scope thereof, as defined by the following claims. It is therefore intended that all matter contained in the above description or shown in the accompanying drawings shall be interpreted as illustrative and not in a limiting sense.

I claim:

1. A detachable flash lamp unit for cameras comprising, a casing having a forwardly open front compartment and a downwardly open rear compartment, said forward compartment containing battery and lamp socket elements electrically connected in series and provided with exteriorly extending leads to detachably connect the same in circuit with a shutter actuated make and break means of a camera to be served by the unit, said socket element opening through the bottom of said front compartment, a manipulatable cover to close said front compartment, a collapsible reflector means comprising a plurality of superposed concavo-convex reflector sections having cooperative means at their vertical edges to slidably relate the same for extension from the open bottom of said rear compartment behind a flash lamp mounted in said socket element or for collapse into said rear compartment, said rear compartment having guide means to slidably support the rearmost of said reflector sections including means to limit outward sliding extension thereof, and manipulatable means to detachably secure said casing to the camera to be served by the unit.

2. A detachable flash lamp unit for cameras as defined in claim 1 wherein the means to detachably secure the unit to the camera to be served thereby comprises, a perpendicular stem, bearing means within said rear compartment to rotatably mount said stem for extension therethrough, the upper end of said stem having a coupling screw portion disposed to project exteriorly from the top of said casing, and the lower end of said stem having a finger piece disposed to project exteriorly through the open bottom of the rear compartment of said casing, said coupling screw portion being adapted for engagement with an internally screw-threaded tripod attachment socket of the camera.

GEORGE F. BOESSER.